US012533385B2

(12) United States Patent
Liu et al.

(10) Patent No.: US 12,533,385 B2
(45) Date of Patent: Jan. 27, 2026

(54) USE OF MULBERRY TWIG ALKALOIDS IN PREPARATION OF DRUG FOR TREATING POLYCYSTIC OVARIAN SYNDROME

(71) Applicants: BEIJING WEHAND-BIO PHARMACEUTICAL CO., LTD, bEIJING (CN); GUANGXI WEHAND-BIO PHARMACEUTICAL CO., LTD, Guangxi (CN)

(72) Inventors: Yuling Liu, Beijing (CN); Yuanyuan Liu, Beijing (CN); Huijuan Li, Beijing (CN); Dongdong Liu, Beijing (CN); Zhihua Liu, Beijing (CN); Xingang Wang, Beijing (CN); Yanmin Chen, Beijing (CN); Tingting Wang, Beijing (CN); Yuanyuan Zou, Beijing (CN); Hongzhen Yang, Beijing (CN); Lili Gao, Beijing (CN)

(73) Assignees: BEIJING WEHAND-BIO PHARMACEUTICAL CO., LTD, Beijing (CN); GUANGXI WEHAND-BIO PHARMACEUTICAL CO., LTD, Guangxi (CN)

( * ) Notice: Subject to any disclaimer, the term of this patent is extended or adjusted under 35 U.S.C. 154(b) by 0 days.

(21) Appl. No.: 18/843,852

(22) PCT Filed: Mar. 3, 2023

(86) PCT No.: PCT/CN2023/079443
§ 371 (c)(1),
(2) Date: Sep. 4, 2024

(87) PCT Pub. No.: WO2023/165584
PCT Pub. Date: Sep. 7, 2023

(65) Prior Publication Data
US 2025/0114423 A1 Apr. 10, 2025

(30) Foreign Application Priority Data
Mar. 4, 2022 (CN) .......................... 202210211599.8

(51) Int. Cl.
*A61K 36/605* (2006.01)
*A61P 5/24* (2006.01)

(52) U.S. Cl.
CPC .............. *A61K 36/605* (2013.01); *A61P 5/24* (2018.01); *A61K 2236/331* (2013.01); *A61K 2236/51* (2013.01); *A61K 2236/53* (2013.01); *A61K 2236/55* (2013.01)

(58) Field of Classification Search
None
See application file for complete search history.

(56) References Cited

U.S. PATENT DOCUMENTS

2025/0114423 A1   4/2025   Liu

FOREIGN PATENT DOCUMENTS

| CN | 101129476 | 2/2008 |
|----|-----------|--------|
| CN | 110898060 | 3/2020 |
| CN | 111568948 | 8/2020 |
| CN | 111658692 | 9/2020 |
| CN | 113143997 | 7/2021 |
| CN | 114010683 | 2/2022 |
| CN | 115227740 | 10/2022 |
| CN | 116688000 | 9/2023 |
| EP | 4487861 | 1/2025 |
| JP | 2014043432 | 3/2014 |
| WO | 2023165584 | 9/2023 |

OTHER PUBLICATIONS

Zhang (CN 115227740 A (Oct. 10, 2025)—English translation).*
Liu (CN 111568948 A (Aug. 25, 2020)—English translation).*
Yu (CN 103285319 A (Sep. 11, 2013)—English translation).*
Rahman, H. S., et al., "The Effectiveness of Super Ovulation and Multiple Pregnancies in Sprague Dawley Rat using Morus alba Linn. Fruit," International Journal of Medical Research & Health Sciences, vol. 7, No. 1 (2018), pp. 17-26.
Li H, et al., "Effect of Sangzhi alkaloids on glucose and lipid metabolism", Chin J Diabetes 2022, 30(2):154-158.
Li, L., "Comparison of the metabolic effects of antidiabetic agents and orlistat: A network Meta-analysis," Chongqing Medical University, Master's Thesis (May 2018), 66 Pages.
Liu C et al., "Comparative analysis of 1-deoxynojirimycin contribution degree to α-glucosidase inhibitory activity and physiological distribution in Morus alba L.", Industrial Crops and Products 2015, 70:309-315.
Liu HY, et al., "Interference effect of oral administration of mulberry branch bark powder on the incidence of type II diabetes in mice induced by streptozotocin", Food and Nutrition Research 2016, 60(31606):1-11.
Wen J, et al., "Effects of mulberry leaf extracts on insulin resistance in MSG rats", Tianjin Journal of Traditional Chinese Medicine 2015, 32(4):234-238.

* cited by examiner

*Primary Examiner* — Susan Hoffman
(74) *Attorney, Agent, or Firm* — Riverside Law LLP

(57) ABSTRACT

Use of a mulberry extract in the preparation of a product for treating and/or improving polycystic ovarian syndrome. It is demonstrated in the experiment that the mulberry twig alkaloids can reduce the ovarian weight of rats with polycystic ovarian syndrome and improve the ovarian pathology, regulate the estrous cycle of rats with polycystic ovarian syndrome in the intervention process, and can remarkably adjust the secretion level of sex hormones in rats with polycystic ovarian syndrome.

6 Claims, 9 Drawing Sheets

(A)

(B)

(C)

USE OF MULBERRY TWIG ALKALOIDS IN PREPARATION OF DRUG FOR TREATING POLYCYSTIC OVARIAN SYNDROME

CROSS-REFERENCE TO RELATED APPLICATIONS

This application is a U.S. national phase application filed under 35 U.S.C. § 371 claiming benefit to International Patent Application No. PCT/CN2023/079443, filed Mar. 3, 2023, which claims priority to Chinese Patent Application No. 202210211599.8, filed Mar. 4, 2022, the disclosures of each of which are incorporated by reference herein in their entireties.

TECHNICAL FIELD

The present disclosure relates to the field of medicine, specifically to use of mulberry twig (Ramulus Mori) alkaloids in the preparation of a drug for treating the polycystic ovarian syndrome (PCOS).

BACKGROUND

Polycystic Ovarian Syndrome (PCOS) is one of the endocrine diseases having a high incidence in women of childbearing age, with the common clinical manifestations of high androgen levels, oligoovulation or anovulation, and polycystic morphological changes in ovaries. PCOS is caused by abnormal secretion of sex hormones in the body as a result of a variety of factors, resulting in a failure of follicles to mature and excessive proliferation of follicular walls, and their persistent existence in the ovaries and turning into cysts, which not only increases the incidence of gynecological diseases such as infertility and cervical cancer, but also causes various mental illnesses such as depression. Meanwhile, studies have suggested that maternal PCOS not only increases the risk of pregnancy-related complications, but also increases the risk of various metabolic diseases such as "psychiatric disorders" and PCOS in their offspring via epigenetic inheritance. Statistically, the risk of PCOS in daughters of pregnant women with PCOS increases by 5 times. PCOS is a reproductive endocrine disease resulting from multiple causes, which is highly heterogeneous because different patients have quite different pathophysiologic characteristics. At present, the medical treatment of the polycystic ovarian syndrome still remains at the stage of treatment for its clinical manifestations, for example, taking oral contraceptives to regulate the menstrual cycle, taking ethinylestradiol and cyproterone acetate tablets or the like to reduce the androgen levels, or taking clomifene citrate (CC) or letrozole for ovulation induction treatment in patients with the reproductive requirements. However, clinical treatment often has a limited efficacy and is accompanied by many side effects, for example, taking contraceptives predisposes to fluid retention, hepatic dysfunction, and mental illnesses such as depression; and taking clomiphene or clomifene citrate (CC) for ovulation induction treatment predisposes to ovarian hyperstimulation syndrome (OHSS). Common surgical treatments include laparoscopic ovarian drilling and ovarian wedge resection. Possible problems arising from the laparoscopic ovarian drilling include ineffective treatment, pelvic adhesions, ovarian dysfunction and the like, whereas the ovarian wedge resection is associated with the drawbacks such as big trauma and postoperative adhesions of peri-ovarian tissue, which has no longer been commonly used in clinical practice nowadays. These treatments are not ideal for PCOS, have serious side effects and can only relieve some symptoms. Therefore, how to develop a safe and effective drug for treatment of PCOS to reduce its danger to life safety and increase the fertility rate has become a major scientific issue that needs to be solved urgently worldwide.

SUMMARY

An objective of the present disclosure is to provide new pharmaceutical use of a mulberry extract or a main active ingredient thereof.

The new use of the mulberry extract or the main active ingredient thereof provided in the present disclosure is any one of the following (a1) to (a4):
(a1) use of a mulberry extract in the preparation of a product for treating polycystic ovarian syndrome;
(a2) use of a mulberry extract in the preparation of a product for ameliorating polycystic ovarian syndrome;
(a3) use of a mulberry extract for treating polycystic ovarian syndrome; and
(a4) use of a mulberry extract for ameliorating polycystic ovarian syndrome.

The treating and/or ameliorating the polycystic ovarian syndrome are embodied in at least one of
1) regulating a secretion level of sex hormone in a patient with the polycystic ovarian syndrome;
2) regularizing a menstrual cycle in a patient with the polycystic ovarian syndrome; and
3) ameliorating an ovarian polycystic-like state in a patient with polycystic ovaries.

The sex hormone is at least one selected from the group consisting of T (testosterone), E2 (estradiol), LH (luteinizing hormone), PRL (prolactin), P (progesterone), SHBG (sex hormone-binding globulin), and AMH (anti-Müllerian hormone).

The present disclosure further claims use of a mulberry extract or a main active ingredient thereof, which is at least one of the following (b1) to (b6):
(b1) preparing a product for regulating a secretion level of sex hormone in a patient with polycystic ovarian syndrome;
(b2) preparing a product for regularizing a menstrual cycle in a patient with polycystic ovarian syndrome;
(b3) preparing a product for ameliorating an ovarian polycystic-like state in a patient with polycystic ovaries;
(b4) regulating a secretion level of sex hormone in a patient with polycystic ovarian syndrome;
(b5) regularizing a menstrual cycle in a patient with polycystic ovarian syndrome; and
(b6) ameliorating an ovarian polycystic-like state in a patient with polycystic ovaries.

The product is a drug or a drug preparation.

The mulberry extract is a Ramulus Mori extract, a Cortex Mori extract and/or a Folium Mori extract.

Alternatively, the mulberry extract may also be provided in the form of a commercially available mulberry twig alkaloids tablets (SFDA approval No.: Z20200002).

In one embodiment, the mulberry extract or the main active ingredient thereof according to the present disclosure may ameliorate apoptosis of ovarian granulosa cells in patients with PCOS.

In one embodiment, the mulberry extract or the main active ingredient thereof according to the present disclosure reduces the body weight and ovarian weight of patients with PCOS.

The mulberry extract may be prepared by the method disclosed in CN 113143997 A. The specific preparation method comprises the steps of:
1) preparing a crude extraction solution of a plant of Moraceae; and
2) separating the crude extraction solution via a cation resin and/or an optional anion resin to obtain the mulberry extract.

The method may further comprise the steps of:
3) subjecting effluent obtained from resin separation in step 2) to alcohol precipitation, and collecting a supernatant;
4) subjecting the supernatant to concentration and drying.

The method may further comprise the step of: subjecting effluent obtained from resin separation in step 2) to concentration and drying.

The mulberry extract acts on humans or mammals.

The plant of Moraceae may be *Morus atropurpurea* Roxb, *Morus multicaulis* Perrott., *Morus alba* L., *Morus serrata* Roxb., *Morus bombycis* Koidz. or hybrid mulberry, and the hybrid mulberry is preferably Yuesang No. 11, Guisangyou No. 62 or Sangteyou No. 2. Various parts such as the leaf, root, branch, bark, bud, stem, and fruit of the plant may be used.

The mulberry extract may be a mulberry alkaloids extract.

In one embodiment of the present disclosure, the mulberry extract includes alkaloids, polysaccharides, flavonoids, and amino acids.

Preferably, the alkaloids include at least one of 1-deoxynojirimycin (DNJ), N-methly-1-deoxynojirimycin, fagomine (FAG), 3-epi-fagomine, 1,4-dideoxy-1,4-imino-D-arabinitol (DAB), calystegin B2, calystegin C1, 2-O-($\alpha$-D-galactopyranosyl)-1-deoxynojirimycin, 6-O-($\beta$-D-glucopyranosyl)-1-deoxynojirimycin, and 1,4-dideoxy-1,4-imino-(2-O-$\beta$-D-glucopyranosyl)-D-arabinitol.

DNJ has a weight percentage of no less than 30% of alkaloids. Preferably, DNJ has a weight percentage of no less than 40% of alkaloids. More preferably, DNJ has a weight percentage of no less than 50% of alkaloids.

Preferably, based on the mulberry extract, the weight content of each component is as follows:

| | |
|---|---|
| Alkaloids | 3% to 99%, |
| Polysaccharides | 0.2% to 70%, |
| Flavonoids | 0% to 10%, |
| Amino acids | 0% to 50%, |
| Other components | 0% to 25%; | preferably, based on the mulberry extract, the weight content of each component is as follows:

| | |
|---|---|
| Alkaloids | 30% to 99%, |
| Polysaccharides | 0.2% to 35%, |
| Flavonoids | 0% to 2%, |
| Amino acids | 0% to 30%, |
| Other components | 0% to 20%; | more preferably, based on the mulberry extract, the weight content of each component is as follows:

| | |
|---|---|
| Alkaloids | 50% to 99%, |
| Polysaccharides | 0.2% to 35%, |
| Flavonoids | 0% to 2%, |
| Amino acids | 0% to 30%, |
| Other components | 0% to 20%; | the content of alkaloids may be 60% to 70% or 70% to 80%;

further preferably, based on the mulberry extract, the weight content of each component is as follows:

| | |
|---|---|
| Alkaloids | 50% to 99%, |
| Polysaccharides | 0.2% to 25%, |
| Flavonoids | 0% to 1%, |
| Amino acids | 0% to 20%, |
| Other components | 0% to 20%. |

In one embodiment, the preparation for the mulberry extract comprises the following steps: preparing a crude extraction solution; optionally, separating via a cation resin and/or an anion resin; optionally, subjecting effluent obtained from resin separation to alcohol precipitation; and optionally, subjecting to concentration and drying. Preferably, the preparation for the mulberry extract comprises the following steps: step 1): preparing a crude extraction solution; step 2): separating via a cation resin and/or an optional anion resin; optional step 3): subjecting effluent obtained from resin separation in step 2) to alcohol precipitation; and optional step 4): subjecting to concentration and drying.

In one embodiment, the mulberry extract is prepared according to the following steps: Ramulus Mori, Cortex Mori or Folium Mori is crushed, and extracted by heating reflux with water and/or alcoholic solution or acid water in a solvent amount of 3 to 20 times that of the raw medicinal materials; the extraction was repeated for 1 to 3 times; the extracting solutions were combined, concentrated, loaded onto a cation exchange resin, and then eluted with 0.2 to 3N of ammonia water after all the unadsorbed impurities are washed away with distilled water; the eluate is concentrated and loaded onto an anion exchange resin; the unadsorbed parts are collected, added with ethanol, precipitated to remove impurities, and centrifuged; the supernatant is concentrated under reduced pressure or spray dried or freeze dried to afford the extract.

In one embodiment, the mulberry extract is prepared by the following steps: Ramulus Mori, Cortex Mori or Folium Mori is crushed, and extracted by heating reflux with water and/or alcoholic solution or acid water in a solvent amount of 3 to 20 times that of the raw medicinal materials; the extraction was repeated for 1 to 3 times; the extracting solutions were combined, concentrated, loaded onto a cation exchange resin, and then eluted with 0.2 to 3N of ammonia water after all the unadsorbed impurities are washed away with distilled water; the eluate is concentrated and loaded onto an anion exchange resin; the unadsorbed parts are collected and concentrated under reduced pressure or spray dried or freeze dried to afford the extract.

In one embodiment, the mulberry extract is prepared by the following steps: Ramulus Mori, Cortex Mori or Folium Mori is crushed, and extracted by heating reflux with water and/or alcoholic solution or acid water in a solvent amount of 3 to 20 times that of the raw medicinal materials; the extraction was repeated for 1 to 3 times; the extracting solutions were combined, concentrated, loaded onto a cation exchange resin, and then eluted with 0.2 to 3N of ammonia water after all the unadsorbed impurities are washed away with distilled water; the eluate is concentrated under reduced pressure or spray dried or freeze dried to afford the extract.

In one embodiment, the mulberry extract is prepared by the following steps: Ramulus Mori, Cortex Mori or Folium Mori is crushed, and extracted by heating reflux with water in a solvent amount of 3 to 20 times (preferably 4 to 15 times) that of the raw medicinal materials; the extraction was repeated for 1 to 3 times (preferably 0.5 to 3 h each time); the extracting solutions were combined, concentrated, loaded onto a cation exchange resin, and then eluted with 0.2 to 3N of ammonia water after all the unadsorbed impurities are washed away with distilled water; the eluate is concentrated and loaded onto an anion exchange resin; the unadsorbed parts are collected, added with ethanol, precipitated to remove impurities, and centrifuged; the supernatant is concentrated under reduced pressure or spray dried or freeze dried to afford the extract.

Preferably, after being packed into the column, the cation resin is subjected to activation by being washed with an acidic solution, an alkaline solution and an acidic solution successively. Preferably, the resin is washed with an alkaline solution until the pH of the eluate is 8.0 to 9.5, preferably 8.5 to 9.5; preferably, the alkaline solution is ammonia solution, sodium hydroxide solution, potassium hydroxide solution or sodium carbonate solution; preferably, the concentration of the alkaline solution is 0.5 to 4 mol/L. Preferably, the resin is washed with an acidic solution until the pH of the eluate is 3.0 to 7.0, preferably 4.5 to 6.5. Preferably, the acidic solution is selected from hydrochloric acid solution, phosphoric acid solution and disodium hydrogen phosphate-citric acid buffer. Optionally, the cation resin may also be washed with deionized water having a volume of 3 to 5 times the column volume after the last washing with the acidic solution. Preferably, the cation resin is 732-type strongly acidic styrene-based cation exchange resin, 734-type strongly acidic styrene-based cation exchange resin, and D001-type macroporous and strongly acidic styrene-based cation exchange resin.

Preferably, the weight ratio of the cation resin to the charged plant raw material is 1:2 to 1:20. After loading the crude extraction solution of the plant onto the cation resin, the loaded cation resin is subjected to elution with an eluent. Preferably, the eluent has a concentration of 0.5 to 2.5 mol/L. Preferably, the flow rate of the eluent is 5 to 10 BV/h.

Preferably, the anion resin is 717-type strongly alkaline styrene-based anion exchange resin, D201-type macroporous and strongly alkaline styrene-based anion exchange resin, and D218-type macroporous and strongly alkaline acrylic-based anion exchange resin. Preferably, the weight ratio of the anion resin to the charged plant raw material is 1:1 to 1:32. Collection begins when the liquid flows out of the anion resin. Preferably, the collection is terminated when the volume of the collection solution reaches 0.1 to 5 times the weight of the charged plant raw material.

Preferably, the weight ratio of the ethanol used for alcohol precipitation and the charged plant raw material is 1:20 to 1:300. In the alcohol precipitation, the stirring speed is 40 to 500 rpm.

Preferably, the drug further comprises a pharmaceutically acceptable carrier. The carrier is an inactive component that conforms to the administration route or the mode of administration and has no toxic effect on the human body. The carrier may be a solid or liquid excipient. Solid excipients, for example, include microcrystalline cellulose, mannitol, lactose, pregelatinized starch, low-substituted hydroxypropyl cellulose, crospovidone, sodium carboxymethyl starch, aspartame, calcium hydrogen phosphate, sodium lactate, poloxamer, sodium dodecyl sulfate, sodium carboxymethyl cellulose, gelatin, xanthan gum, povidone, starch, magnesium stearate, sodium carboxymethyl starch, and talc. Liquid excipients, for example, include water, ethanol, syrup, and glycerin.

Preferably, the drug is an oral dosage form; further preferably, the drug is a tablet, a capsule, an oral solution, an oral emulsion, a pill, a granule, a syrup, and a powder.

The present disclosure further provides a method for preventing and/or treating polycystic ovarian syndrome, comprising the step of administering, to a subject animal or human, the mulberry extract or the main active ingredient thereof to prevent and/or treat the polycystic ovarian syndrome.

In the present disclosure, the animal may be a mammal.

PCOS is a metabolic disease caused by multiple factors. Traditional Chinese medicines have multiple components, may exert a pharmacodynamic effect on multiple targets, and have the advantages of fewer side effects, high safety, etc.

The present disclosure demonstrates in the pharmacodynamic experiments that:

1. SZ-A could reduce the ovarian weight and ameliorate the ovarian pathology in rats with PCOS;
2. the SZ-A group regularizes the estrous cycle of rats with PCOS in the intervention process; and
3. the SZ-A drug could significantly regulate the secretion level of sex hormone in rats with PCOS.

BRIEF DESCRIPTION OF THE DRAWINGS

To illustrate the specific embodiments of the present disclosure or the technical solutions in the prior arts more clearly, the drawings required for descriptions of the specific embodiments or prior arts will be briefly introduced below. Obviously, the drawings described below are some embodiments of the present disclosure, from which other drawings may also be available for a person skilled in the art without affording any creative efforts.

BEST MODES OF IMPLEMENTING THE INVENTION

Figure 1:
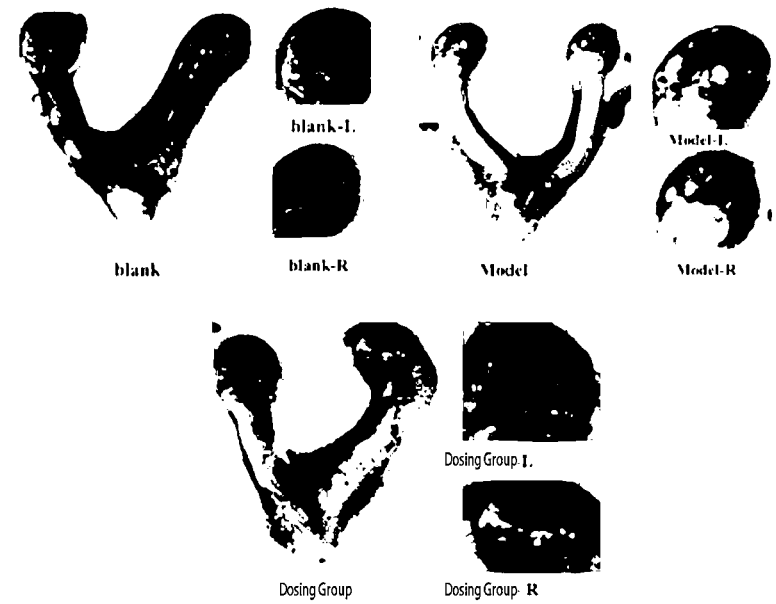
FIG. 1(A) shows pictures of ovarian morphologies of animals in the blank group, model group, and dosing group after administration for 21 days.
FIG. 1(C) shows the body weight of animals in the blank group, model group, and dosing group after administration for 21 days.
FIG. 1(B) shows the HE staining results of ovarian tissue sections after administration for 21 days.
Figure 1:
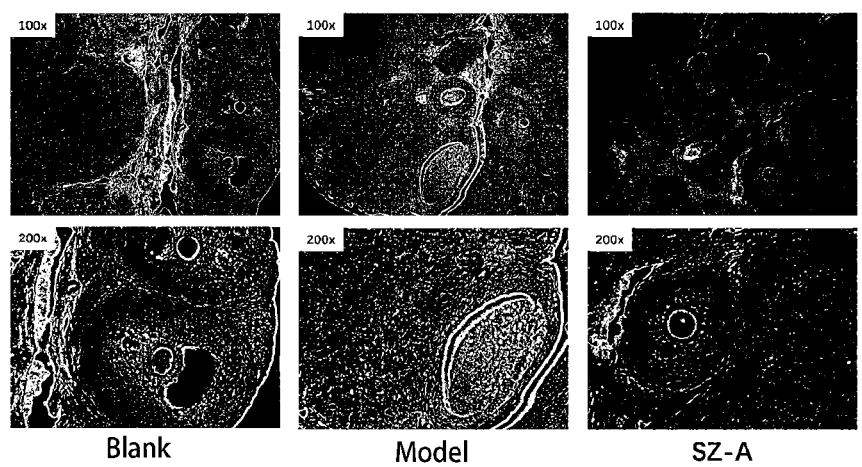
Figure 1:
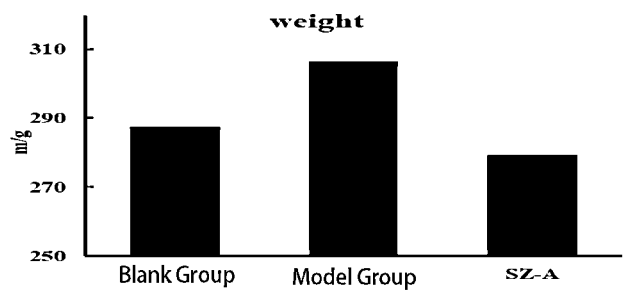
Figure 2:
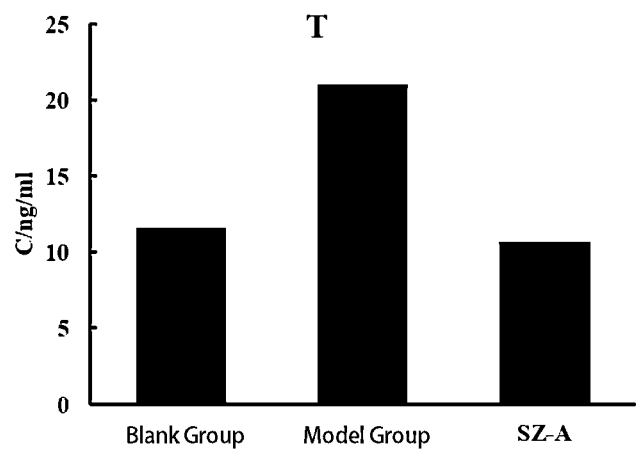
FIG. 2 shows the testosterone (T) levels in serum of animals in the blank group, model group, and dosing group after administration for 21 days in Experimental Example 9.
Figure 3:
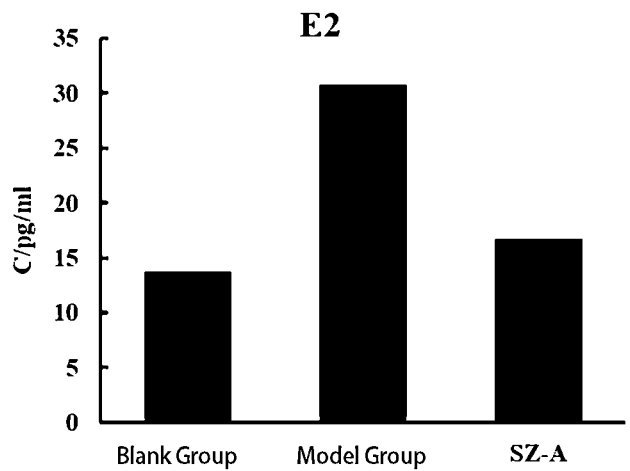
FIG. 3 shows the estradiol (E2) levels in serum of animals in the blank group, model group, and dosing group after administration for 21 days in Experimental Example 9.
Figure 4:
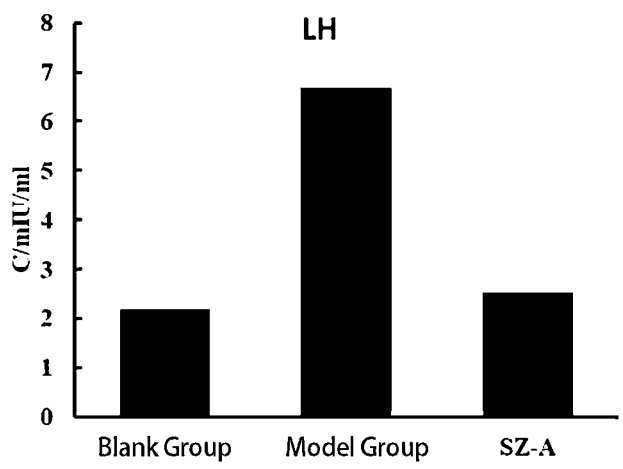
FIG. 4 shows the luteinizing hormone (LH) levels in serum of animals in the blank group, model group, and dosing group after administration for 21 days in Experimental Example 9.
Figure 5:
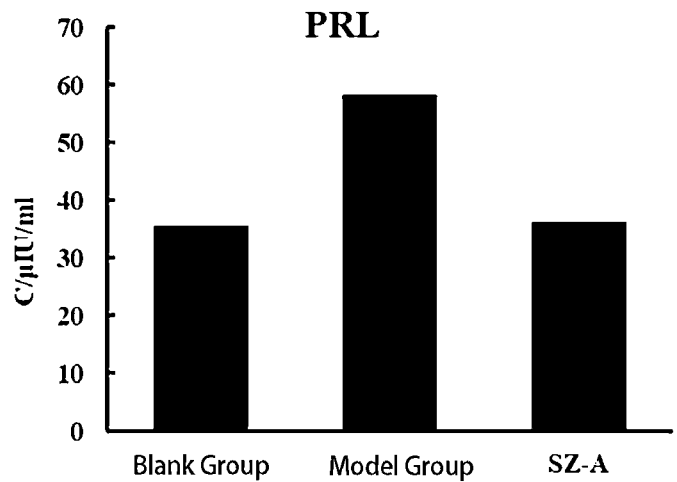
FIG. 5 shows the prolactin (PRL) levels in serum of animals in the blank group, model group, and dosing group after administration for 21 days in Experimental Example 9.
Figure 6:
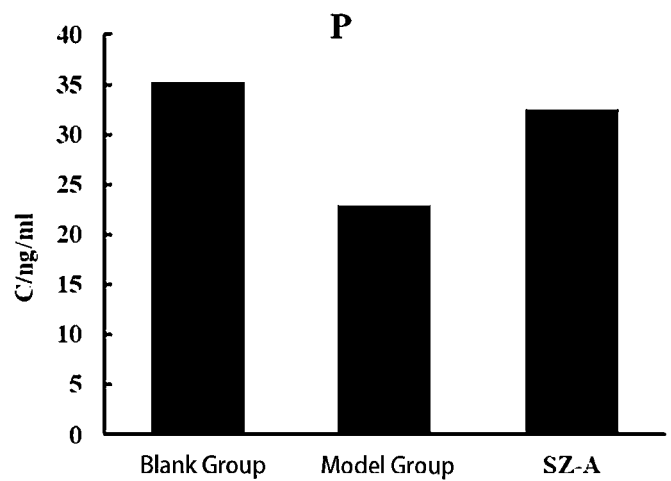
FIG. 6 shows the progesterone (P) levels in serum of animals in the blank group, model group, and dosing group after administration for 21 days in Experimental Example 9.
Figure 7:
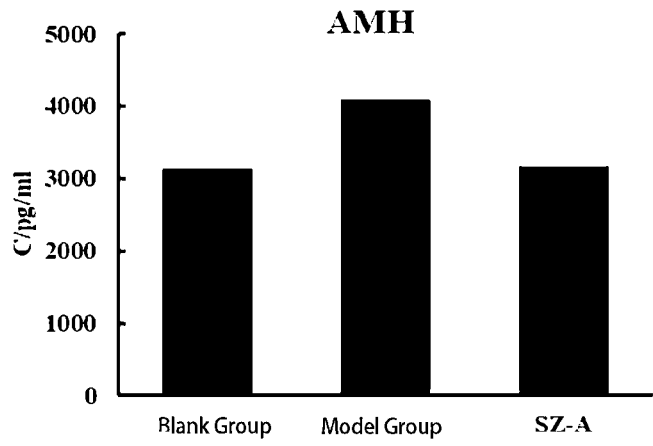
FIG. 7 shows the AMH levels in serum of animals in the blank group, model group, and dosing group after administration for 21 days in Experimental Example 9.
Figure 8:
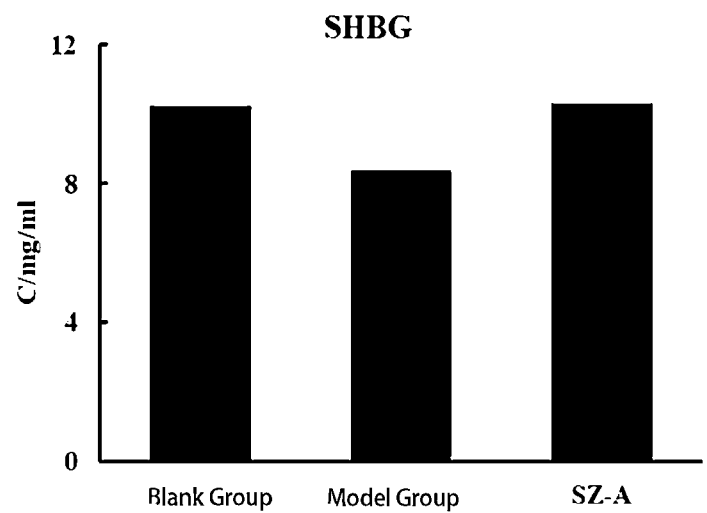
FIG. 8 shows the SHBG levels in serum of animals in the blank group, model group, and dosing group after administration for 21 days in Experimental Example 9.

The present disclosure will be further described in detail below with reference to the examples. With those illustrative descriptions, the features and advantages of the present disclosure will become clearer and more definite. However, the present disclosure is not limited to the following examples. All the methods are conventional methods unless otherwise specified. All the raw materials are commercially available unless otherwise specified.

Herein the specialized term "exemplary" means "used as an instance, or an example, or explanatory". Any "exemplary" example given here is not necessarily construed as being superior to or better than other examples.

In addition, the technical features involved in different embodiments of the present disclosure described below can be combined with one another as long as they are not in conflict with one another.

The content of the components involved in the present disclosure is determined by the disclosed methods (referring to the methods disclosed in the patents with the publication numbers of CN111077247A and CN110393738A).

Abbreviations involved in the effect verification part of the mulberry extract are as follows:

T (testosterone), E2 (estradiol), LH (luteinizing hormone), P (progesterone), PRL (prolactin), LEP (leptin), SHBG (sex hormone-binding globulin), AMH (anti-Müllerian hormone), GnRH (gonadotropin-releasing hormone).

Test methods for the hormones are as follows:

E2: estradiol radioimmunoassay KIT—HTA Co., Ltd. (SFDA approval No.: 520033010);

LH: Iodine[$^{125}$I] Human Luteinizing Hormone Radioimmunoassay Kit (SFDA approval No.: 510950161);

PRL: Iodine[$^{125}$I] Prolactin Radioimmunoassay Kit (SFDA approval No.: S10950161);

T: Iodine[$^{125}$I] Testosterone Radioimmunoassay Kit (SFDA approval No.: S10940093);

ADP, GnRH, SHBG, and AMH in serum of each animal were tested using Elisa kits;

P: Progesterone Radioimmunoassay Kit—Union Medical & Pharmaceutical Technology (Tianjin) Co., Ltd. (SFDA approval No.: S10950202).

I. Preparative Examples of Mulberry Extract

Example 1: Preparation 1 of Mulberry Extract 1000 kg of fresh Ramulus Mori (*Morus serrata* Roxb. Yuesang No. 11) were weighed and crushed, then added with 4000 L of water, and extracted by heating reflux for 2 h. The extracting solutions were combined, and filtered to remove insoluble matters, thereby obtaining a crude extraction solution. The crude extraction solution was concentrated by heating until the solid content reached 4% by mass, held at 50° C., and served as a loading solution for the cation resin column.

150 kg of D113-type macroporous and weakly acidic phenylpropene-based cation resin was filled in the column, washed with 2 mol/L hydrochloric acid solution until the pH of the eluate was 4.5; washed with 1 mol/L sodium hydroxide solution until the pH of the eluate was 8.5; washed with 2 mol/L hydrochloric acid solution until the pH of the eluate was 4.5; and then rinsed with 5 times column volume of deionized water to complete the activation. The concentrated extracting solution was loaded, and then eluted with 1000 L of 2.5 mol/L ammonia water at an elution speed of 6 BV/h. The eluate was collected when the effluent from the cation resin column was detected to be at pH>7. When the collection solution was up to 900 L, the collection was stopped. The collection solution was purified directly over the anion resin column.

62.5 kg of D218-type macroporous and strongly alkaline acrylic-based anion resin was filled in the column, washed with 1.5 mol/L sodium hydroxide solution until the pH of the eluate was 9.0; washed with 1.5 mol/L hydrochloric acid solution until the pH of the eluate was 3.5; and washed with 1.5 mol/L sodium hydroxide solution until the pH of the eluate was 9.0 to complete the activation. The eluate collected from the cation resin was loaded onto the anion resin. The effluent was collected and the collection was terminated when the effluent was up to 870 L.

The collection solution was centrifuged to remove impurities, and then concentrated through the reverse osmosis membrane. The specific gravity of the concentrated liquid was 1.25. It was transferred to an alcohol precipitation tank, and 25 L of anhydrous ethanol was added when the stirring paddle was at 500 rpm. After adding the ethanol, the solution was stopped stirring, and subjected to alcohol precipitation for 24 h. The supernatant was taken and concentrated under reduced pressure to obtain an extractum.

The effluent was concentrated under reduced pressure to obtain Ramulus Mori extractum, in which the content of alkaloids was 52% by mass (in the alkaloids, the DNJ content was 69.5% by mass, the DAB content was 11.5% by mass, and the FAG content was 15% by mass), the content of polysaccharides was 22% by mass, the content of flavonoids was 0.8% by mass, and the content of amino acids was 20% by mass.

Example 2: Preparation 2 of Mulberry Extract 10 kg of fresh Ramulus Mori (Sangteyou No. 2) was weighed and crushed, then added with 150 L water in 2 times, and extracted by the decocting method for 3 h each time. The extracting solutions were combined, and filtered to remove the insoluble matters. The extracting solution was concentrated by heating until the solid content reached 8% by mass. It was transferred to an alcohol precipitation tank. 2367.9 g of anhydrous ethanol (3 L) was added when the stirring paddle was at 300 rpm. After adding the ethanol, the solution was stopped stirring, and subjected to alcohol precipitation for 24 h. The supernatant was taken as a loading solution for the cation resin column. 5 kg of 002SC-type strongly acidic styrene-based cation resin was filled in the column. The cation resin was activated according to the method described in Example 1. The extracting solution after concentration and alcohol precipitation was loaded, and then eluted with 100 L of 5 mol/L potassium chloride at an elution speed of 5 BV/h. The effluent was detected with 20% silicotungstic acid, and started to collect when a white precipitate was generated. The collection was terminated when the collection solution reached 25 L. The collection solution was purified directly over the anion resin column.

10 kg of 711-type strongly alkaline styrene-based anion resin was filled in the column. The anion resin was activated according to the method described in Example 1. The eluate collected from the cation resin was loaded onto the anion resin. The effluent was collected and the collection was terminated when the effluent was up to 15 L. The collection solution was reloaded onto the cation resin, and separated twice via the cation resin and anion resin in sequence according to the methods described above.

The collection solution obtained after three column separation was centrifuged to remove impurities, and then concentrated through the reverse osmosis membrane. The specific gravity of the concentrated liquid was 1.25. It was transferred to an alcohol precipitation tank, and 125 g of anhydrous ethanol was added when the stirring paddle was at 1000 rpm. After adding the ethanol, the solution was stopped stirring, and subjected to alcohol precipitation for 24 h. The supernatant was taken and concentrated under reduced pressure to obtain an extractum. In addition, fresh Cortex Mori and Folium Mori (Sangteyou No. 2) were prepared and extracted. The extraction method and parameters were as same as those described above.

In the resulting Ramulus Mori extract, the content of alkaloids was 98% by mass, the content of polysaccharides was 0.2% by mass, the content of flavonoids was 0.05% by mass, and the content of amino acids was 0% by mass.

In the resulting Cortex Mori extract, the content of alkaloids was 95% by mass, the content of polysaccharides was 2% by mass, the content of flavonoids was 0.1% by mass, and the content of amino acids was 1% by mass.

In the resulting Folium Mori extract, the content of alkaloids was 90% by mass, the content of polysaccharides was 4% by mass, the content of flavonoids was 0.1% by mass, and the content of amino acids was 3% by mass.

Example 3: Preparation 3 of Mulberry Extract 1000 kg of fresh Ramulus Mori (*Morus atropurpurea* Roxb) were weighed and crushed, then added with 11500 L of water, and extracted by heating reflux for 2 h. The extracting solutions were combined, and filtered to remove insoluble matters, thereby obtaining a crude extraction solution. The crude extraction solution was centrifuged to remove impurities, then concentrated through a reverse osmosis membrane until the solid content reached 1% by mass, and served as a loading solution for the cation resin column.

300 kg of D001-type macroporous and strongly acidic styrene-based cation resin was filled in the column. The cation resin was activated according to the method described in Example 1. The concentrated crude extraction solution was loaded, and eluted with 5000 L of 0.04 mol/L ammonium nitrate at an elution speed of 5 BV/h. The effluent was detected with 20% silicotungstic acid, and started to collect when a white precipitate was generated. The collection was terminated when the collection solution reached 1000 L.

The collection solution resulting from the cation resin column separation was concentrated through a nanofiltration membrane, and concentrated under reduced pressure to obtain an extractum.

In the resulting Ramulus Mori extract, the content of alkaloids was 15% by mass, the content of polysaccharides was 20% by mass, the content of flavonoids was 7% by mass, and the content of amino acids was 45% by mass.

Example 4: Preparation 4 of Mulberry Extract 333 kg of dry Ramulus Mori (Yuesang No. 11) were weighed and crushed, then added with 4000 L of water, and extracted twice by heating reflux, with each reflux for 1 h. The extracting solutions were combined, filtered, and concentrated until 1 kg of crude drug/L was obtained.

150 kg of D113-type macroporous and weakly acidic phenylpropene-based cation resin was filled in the column, washed with 2 mol/L hydrochloric acid solution until the pH of the eluate was 4.5; washed with 1 mol/L sodium hydroxide solution until the pH of the eluate was 8.5; washed with 2 mol/L hydrochloric acid solution until the pH of the eluate was 4.5; and then rinsed with 5 times column volume of deionized water to complete the activation. The concentrated extracting solution was loaded, and then eluted with 1000 L of 2.5 mol/L ammonia water at an elution speed of 6 BV/h. The eluate was collected when the effluent from the cation resin column was detected to be at pH>7. When the collection solution was up to 900 L, the collection was stopped. The collection solution was purified directly over the anion resin column.

125 kg of D218-type macroporous and strongly alkaline acrylic-based anion resin was filled in the column, washed with 1.5 mol/L sodium hydroxide solution until the pH of the eluate was 9.0; washed with 1.5 mol/L hydrochloric acid solution until the pH of the eluate was 3.5; and washed with 1.5 mol/L sodium hydroxide solution until the pH of the eluate was 9.0 to complete the activation. The eluate collected from the cation resin was loaded onto the anion resin. The effluent at pH>8 was collected and the collection was terminated when the effluent was up to 870 L.

The collection solution resulting from the anion resin column separation was filtered via a micro-filtration membrane to remove impurities, and then concentrated through the reverse osmosis membrane. The specific gravity of the concentrated liquid was 1.1. It was transferred to an alcohol precipitation tank, and 15 kg of anhydrous ethanol was added when the stirring paddle was at 400 rpm. After adding the ethanol, the solution was stopped stirring, and subjected to alcohol precipitation for 24 h. The supernatant was taken and concentrated under reduced pressure to obtain Ramulus Mori extractum. The sample content was as follows: the content of alkaloids was 80% by mass, the content of polysaccharides was 5% by mass, the content of flavonoids was 0.1% by mass, and the content of amino acids was 4% by mass.

Example 5: Preparation 5 of Mulberry Extract 400 kg of dry Ramulus Mori (Yuesang No. 11) were weighed and crushed, then added with 4000 L of water, and extracted twice by heating reflux, with each reflux for 1 h. The extracting solutions were combined, filtered, and concentrated until 1 kg of crude drug/L was obtained.

62.5 kg of D218-type macroporous and strongly alkaline acrylic-based anion resin was filled in the column, washed with 1.5 mol/L sodium hydroxide solution until the pH of the eluate was 9.0; washed with 1.5 mol/L hydrochloric acid solution until the pH of the eluate was 3.5; and washed with 1.5 mol/L sodium hydroxide solution until the pH of the eluate was 9.0 to complete the activation. The concentrated solution collected from extraction was loaded onto the anion resin, and the effluent was collected.

The collection solution resulting from the anion resin column separation was filtered via a micro-filtration membrane to remove impurities, then concentrated through the reverse osmosis membrane, and further concentrated under reduced pressure and dried to obtain Ramulus Mori extractum. The sample content was as follows: the content of alkaloids was 3% by mass, the content of polysaccharides was 70% by mass, the content of flavonoids was 10% by mass, and the content of amino acids was 10% by mass.

Example 6: Preparation 6 of Mulberry Extract 1500 kg of fresh Ramulus Mori (*Morus serrata* Roxb. Yuesang No. 11) were weighed and crushed, then added with 6000 L of water, and extracted by heating reflux for 2 h. The extracting solutions were combined, and filtered to remove insoluble matters, thereby obtaining a crude extraction solution. The crude extraction solution was concentrated by heating until the solid content reached 4% by mass, held at 50° C., and served as a loading solution for the cation resin column.

100 kg of D113-type macroporous and weakly acidic phenylpropene-based cation resin was filled in the column, washed with 2 mol/L hydrochloric acid solution until the pH of the eluate was 4.5; washed with 1 mol/L sodium hydroxide solution until the pH of the eluate was 8.5; washed with 2 mol/L hydrochloric acid solution until the pH of the eluate was 4.5; and then rinsed with 5 times column volume of deionized water to complete the activation. The concentrated extracting solution was loaded, and then eluted with 1000 L of 2.5 mol/L ammonia water at an elution speed of 6 BV/h. The eluate was collected when the effluent from the cation resin column was detected to be at pH>7. When the collection solution was up to 900 L, the collection was stopped. The collection solution was purified directly over the anion resin column.

62.5 kg of D218-type macroporous and strongly alkaline acrylic-based anion resin was filled in the column, washed with 1.5 mol/L sodium hydroxide solution until the pH of the eluate was 9.0; washed with 1.5 mol/L hydrochloric acid solution until the pH of the eluate was 3.5; and washed with 1.5 mol/L sodium hydroxide solution until the pH of the eluate was 9.0 to complete the activation. The eluate collected from the cation resin was loaded onto the anion resin. The effluent was collected and the collection was terminated when the effluent was up to 870 L. The effluent was concentrated under reduced pressure to obtain Ramulus Mori extractum, in which the content of alkaloids was 30% by mass, the content of polysaccharides was 35% by mass, the content of flavonoids was 2% by mass, and the content of amino acids was 25% by mass.

Example 7: Preparation 7 of Mulberry Extract 1000 kg of fresh Ramulus Mori (*Morus serrata* Roxb. Yuesang No. 11) were weighed and crushed, then added with 4000 L of water, and extracted by heating reflux for 2 h. The extracting solutions were combined, and filtered to remove insoluble matters, thereby obtaining a crude extraction solution. The crude extraction solution was concentrated by heating until the solid content reached 4% by mass, held at 50° C., and served as a loading solution for the cation resin column.

100 kg of D113-type macroporous and weakly acidic phenylpropene-based cation resin was filled in the column, washed with 2 mol/L hydrochloric acid solution until the pH of the eluate was 4.5; washed with 1 mol/L sodium hydroxide solution until the pH of the eluate was 8.5; washed with 2 mol/L hydrochloric acid solution until the pH of the eluate was 4.5; and then rinsed with 5 times column volume of deionized water to complete the activation. The concentrated extracting solution was loaded, and then eluted with 1000 L of 2.5 mol/L ammonia water at an elution speed of 6 BV/h. The eluate was collected when the effluent from the cation resin column was detected to be at pH>7. When the collection solution was up to 900 L, the collection was stopped. The collection solution was purified directly over the anion resin column.

62.5 kg of D218-type macroporous and strongly alkaline acrylic-based anion resin was filled in the column, washed with 1.5 mol/L sodium hydroxide solution until the pH of the eluate was 9.0; washed with 1.5 mol/L hydrochloric acid solution until the pH of the eluate was 3.5; and washed with 1.5 mol/L sodium hydroxide solution until the pH of the eluate was 9.0 to complete the activation. The eluate collected from the cation resin was loaded onto the anion resin. The effluent was collected and the collection was terminated when the effluent was up to 870 L. The effluent was concentrated under reduced pressure to obtain Ramulus Mori extractum, in which the content of alkaloids was 40% by mass, the content of polysaccharides was 25% by mass, the content of flavonoids was 0.5% by mass, and the content of amino acids was 25% by mass.

Example 8: Preparation 8 of Mulberry Extract 333 kg of dry Ramulus Mori (Yuesang No. 11) were weighed and crushed, then added with 4000 L of water, and extracted twice by heating reflux, with each reflux for 1 h. The extracting solutions were combined, filtered, and concentrated until 1 kg of crude drug/L was obtained.

150 kg of D113-type macroporous and weakly acidic phenylpropene-based cation resin was filled in the column, washed with 2 mol/L hydrochloric acid solution until the pH of the eluate was 4.5; washed with 1 mol/L sodium hydroxide solution until the pH of the eluate was 8.5; washed with 2 mol/L hydrochloric acid solution until the pH of the eluate was 4.5; and then rinsed with 5 times column volume of deionized water to complete the activation. The concentrated extracting solution was loaded, and then eluted with 1000 L of 2.5 mol/L ammonia water at an elution speed of 6 BV/h. The eluate was collected when the effluent from the cation resin column was detected to be at pH>7. When the collection solution was up to 900 L, the collection was stopped. The collection solution was purified directly over the anion resin column.

62.5 kg of D218-type macroporous and strongly alkaline acrylic-based anion resin was filled in the column, washed with 1.5 mol/L sodium hydroxide solution until the pH of the eluate was 9.0; washed with 1.5 mol/L hydrochloric acid solution until the pH of the eluate was 3.5; and washed with 1.5 mol/L sodium hydroxide solution until the pH of the eluate was 9.0 to complete the activation. The eluate collected from the cation resin was loaded onto the anion resin. The effluent at pH>8 was collected and the collection was terminated when the effluent was up to 870 L.

The collection solution resulting from the anion resin column separation was filtered via a micro-filtration membrane to remove impurities, and then concentrated through the reverse osmosis membrane. The specific gravity of the concentrated liquid was 1.1. It was transferred to an alcohol precipitation tank, and 15 kg of anhydrous ethanol was added when the stirring paddle was at 400 rpm. After adding the ethanol, the solution was stopped stirring, and subjected to alcohol precipitation for 24 h. The supernatant was taken and concentrated under reduced pressure to obtain Ramulus Mori extractum. The sample content was as follows: the content of alkaloids was 63% by mass, the content of polysaccharides was 23% by mass, the content of flavonoids was 1% by mass, and the content of amino acids was 5% by mass.

II. Effect Verification of Mulberry Extract

Experimental Example 9: Pharmacodynamic Experiment of Mulberry Extract on Prevention and/or Treatment of Polycystic Ovarian Syndrome (PCOS)

1 Experimental Scheme
1.1 Experimental Animals

Nine 23-day-old female SD rats that were newly weaned, in good health, and had shiny fur were selected and fed in SPF grade.

1.2 Experimental Drugs

DHEA (dehydroepiandrosterone): 30 mg/mL, 30 mg of DHEA were dissolved in 100 μL of anhydrous ethanol, and then 900 μL of soybean oil were added.

1% CMC: 1 g of CMC was weighed, added into 100 mL of pure water, placed on a magnetic stirrer at a temperature of 60° C. and a rotation speed of 500 r/min, and stirred until CMC was completely dissolved and was transparent.

The mulberry extract SZ-A prepared in Example 1 was formulated into different concentrations and dissolved in 1% CMC solutions.

1.3 Modeling and Dosing

In the blank group (3 rats), an equal amount of oil was subcutaneously injected in the nape of the neck. In the model group (6 rats), 0.2 mL/100 g (60 mg/kg) of the DHEA solution was subcutaneously injected in the nape of the neck. The dosing frequency was once a day for a total of 21 days.

From day 11 of modeling, the vaginal secretions were collected from rats at 8:00 a.m. every day, and the vaginal smear was performed on rats for 2 cycles (about 10 days) to monitor the estrous cycle. The testosterone (T) was determined at day 21 of modeling, and the model was evaluated. At day 21 after modeling, the model group showed estrous cycle disorders and high androgen levels, indicating that the PCOS model was successfully constructed.

After successful modeling, the rats were randomized into a blank group, a model group, and a mulberry extract SZ-A dosing group (100 mg/kg/d based on the mulberry twig alkaloids). During the dosing period, the same amount of normal saline was given to the blank group and the model group. The biochemical indexes were tested at day 21 after dosing.

1.4 Indexes Observation and Test Method
   (1) detection of the body weight and the mental conditions of the animals during the dosing period;
   (2) vaginal smear (tested for one cycle, usually 5 days for one estrous cycle in rats, starting test at day 15 to day 20 after dosing);
   (3) expression of related hormones in serum: determining the T, E2, LH, FSH, P, PRL, GnRH, SHBG, and AMH levels at day 21 after dosing;
   (4) sacrificing the rats at day 21 after dosing and retrieving the ovarian tissue for HE staining;
   (5) observing the body weight and the ovarian weight; ovarian weight: weighing and counting the ovarian tissue after the peripheral blood was drained with filter paper; (6) statistical analysis: analyzing by the SPSS software.

2. Test Results (1) Effect of Drug on Body Weight of Rats

The experimental results after administration for 21 days were as shown in FIG. 1(C). Compared with the blank group, the body weight in the model group was remarkably increased; and the body weight of the model rats could be significantly reduced after intervention with drug administration. This suggested that the drug could significantly regulate the body weight of rats with PCOS.

(2) Effect of Drug on the Estrous Cycle of Rats with PCOS

The vaginal smear results showed that the rats in the normal control group had a regular estrous cycle by circulating in the order of proestrus, estrous, metestrus, and diestrus, while the estrous cycle in the PCOS model group changed irregularly. The changes in estrous cycle in the dosing group were improved during the intervention.

(3) Effect of Drug on Ovaries of Rats with PCOS

The ovarian morphologies were observed and the results were shown in FIG. 1(A). Observation of the appearance morphologies of the ovarian tissue of rats in each experimental group showed that in the blank group (blank), the ovarian surfaces of rats were bright red and no obviously dilated follicles were observed; in the model group (model), the ovarian surfaces were pale and multiple dilated follicles of varying sizes were observed; and the dosing group showed that the ovarian surfaces were ruddy and shiny, and the symptoms of pale ovaries in the model group were significantly improved.

The HE staining results of ovarian tissue sections were as shown in FIG. 1(B): in the normal control group, the overall structure of the ovarian tissue of rats was normal under a light microscope, and follicles at different stages of development could be observed under microscope; oocytes and *corona radiata* were observed in near-mature follicles; the number of theca cell layers was relatively small without cystic follicles, and the ovarian interstitial cells were densely and orderly arranged. In the model group, the ovarian tissue of the rats showed obvious abnormalities in its overall structure under a light microscope, with obvious polycystic-like changes; no oocytes were observed in the near-mature follicles, the granulosa cells were loosely arranged, the number of layers was reduced, and some of them detached; *corona radiata* was not observed and the theca cell layer was thicker. In the drug intervention group (SZ-A), the ovarian pathology of rats was significantly ameliorated, in which *corpora lutea* and multiple follicles were observed in their ovaries; oocytes and *corona radiata* were observed in the near-mature follicles; granulosa cells were arranged more densely and the number of layers was increased; the theca cell layer was thinner.

(4) Effect of Drug on Sex Hormone Levels in Serum of Rats with PCOS

The results were as shown in FIG. 2 to FIG. 8. Compared with the blank group, the expressions of T, LH, E2, PRL, and AMH in the serum in the model group were all elevated, and the expressions of SHBG and progesterone P were reduced; compared with the model group, the levels of hormones such as T (testosterone), E2 (estradiol), LH (luteinizing hormone), PRL (prolactin), and AMH in the dosing group after administration for 21 days decreased to different degrees, and the level of SHBG was somewhat increased. This suggested that the drug could significantly regulate the secretion levels of sex hormones in rats with PCOS.

Experimental Example 10: Pharmacodynamic Experiment of Mulberry Extract on LZ-Induced PCOS Model 1. Formulation of Drugs Letrozole (abbreviated as LZ) was formulated at a concentration of 0.25 mg/mL and in a dosing volume of 0.4 mL/100 g.

1% CMC: 1 g of CMC was weighed, added into 100 mL of pure water, placed on a magnetic stirrer at a temperature of 60° C. and a rotation speed of 500 r/min, and stirred until CMC was completely dissolved and was transparent.

The mulberry extract SZ-A prepared in Example 1 was formulated into different concentrations and dissolved in 1% CMC solutions.

2. Experimental Grouping

TABLE 1

| Groups | Abbreviations | Number of Animals | Dosage based on alkaloids (mg/kg/d) | Mode of Administration | Diets |
|---|---|---|---|---|---|
| Blank group | blank | 6 | 0 | Oral gavage | Chow (normal diets) |
| Model group | model | 6 | 0 | | |
| Dosing group | SZ-A | 6 | 100 | | |

3. Experimental Method

Eighteen 6-week-old female SD rats with good health and shiny fur were selected and adaptively fed for 3 days, and then divided into a blank group, a model group, and a dosing group. Of these, rats in the blank group were fed with basal diets; rats in the model group and the dosing group were fed with basal diets while being administered with LZ (1 mg/kg/d) via gavage for 6 weeks, and the PCOS rat models were established. After the models were evaluated as success, the rats in the dosing group were administered according to the dosage and mode listed in Table 1, whereas the rats in the blank group and the model group were administered with an equal amount of normal saline. After administration for 21 days, samples were collected for evaluation on pharmacodynamics, and the test and analysis methods were the same as those in Experimental Example 9.

4. Results

Figure 9:
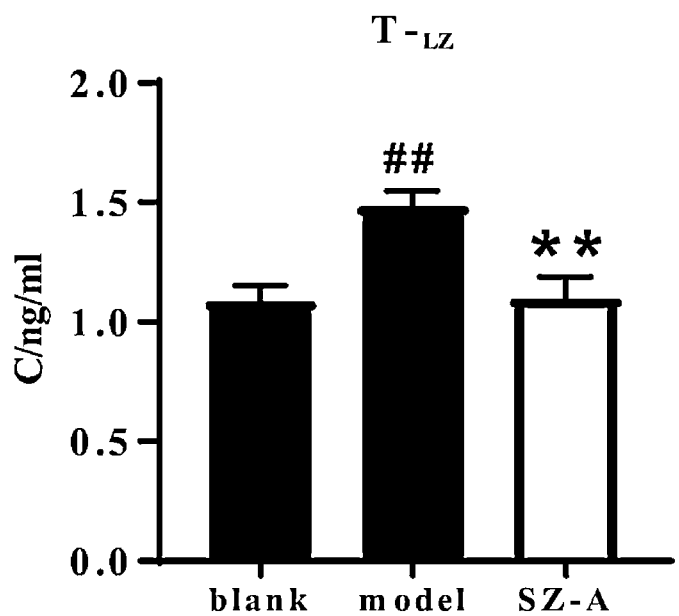
FIG. 9 shows the T levels in serum of animals in the blank group, model group, and dosing group after administration for 21 days in Experimental Example 10; # indicates P<0.05 when the model group is compared with the blank group, and ## indicates P<0.01 when the model group is compared with the blank group; * indicates P<0.05 when the dosing group is compared with the model group, and ** indicates P<0.01 when the dosing group is compared with the model group.

The testosterone (T) level in the model group (vs. blank group) was significantly increased, and the T level after treatment with SZ-A (100 mg/kg) was significantly reduced (see FIG. 9).

Experimental Example 11: Pharmacodynamic Experiment of Mulberry Extract on LZ+HFD-Induced PCOS Model 1. Formulation of Drugs The drugs were formulated as same as in Experimental Example 10.

2. Experimental Grouping

TABLE 2

| Groups | Abbreviations | Number of Animals | Dosage based on mulberry twig alkaloids, mg/kg/d | Mode of Administration | Diets |
|---|---|---|---|---|---|
| Blank group | blank | 6 | 0 | Oral gavage | Chow |
| Model group | model | 6 | 0 | | HFD |
| Dosing group | SZ-A | 6 | 100 | | |

3. Experimental Method

Eighteen 3-week-old female SD rats with good health and shiny fur were selected and adaptively fed for 3 days, and then randomized into a blank group, a model group, and a dosing group. After fed with high-fat diets for 3 weeks, the rats in the model group and the dosing group were administered with LZ (1 mg/kg/d) via gavage for 6 weeks, while being fed with HFD (high-fat diets (research diets D12492)), and the PCOS rat models were constructed. After the models were evaluated as success, the rats in the dosing group were administered according to the dosage and mode listed in the table, during which an equal amount of normal saline was given to the blank group and the model group. At day 10 to day 19 of treatment, two estrous cycles were tested; and after treatment for 21 days, the samples were collected for evaluation on pharmacodynamics, and the test and analysis methods were the same as those in Experimental Example 9.

4. Results

Figure 10:
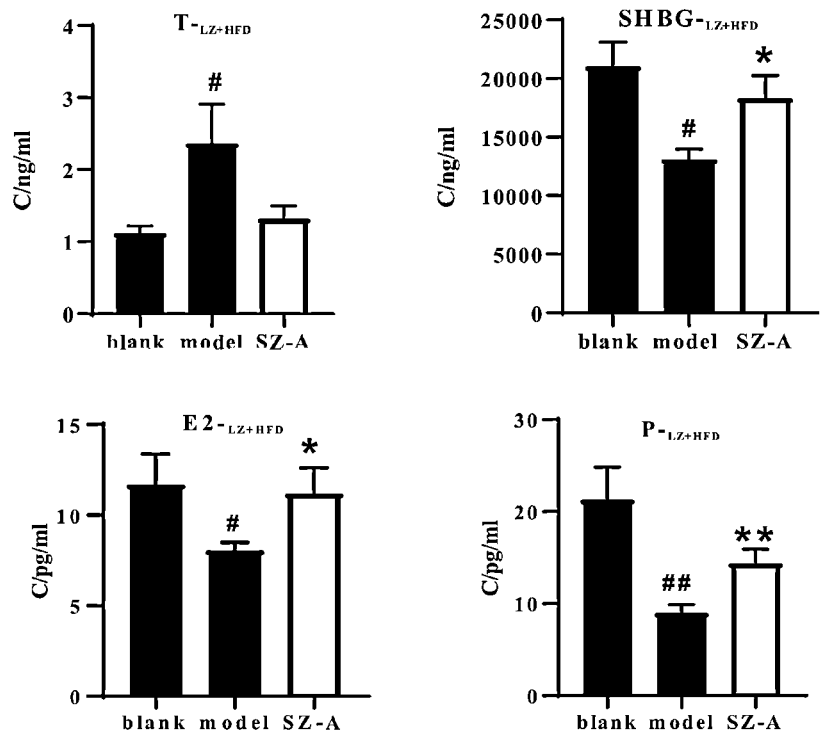
FIG. 10 shows the T, SHBG, E2, and P levels in serum of animals in the blank group, model group, and dosing group after administration for 21 days in Experimental Example 11; # indicates P<0.05 when the model group is compared with the blank group, and ## indicates P<0.01 when the model group is compared with the blank group; * indicates P<0.05 when the dosing group is compared with the model group, and ** indicates P<0.01 when the dosing group is compared with the model group.

1. The SHBG (sex hormone-binding globulin), E2 (estradiol), and P (progesterone) levels in the model group (vs. blank) were significantly reduced, and they were remarkably improved after administration with SZ-A (100 mg/kg); and SZ-A could reduce the expression level of T (testosterone) (see FIG. 10).

2. Ovarian Pathology

Figure 11:
FIG. 11 shows the pathological sections of ovaries of animals in the blank group, model group, and dosing group after administration for 21 days in Experimental Example 11.
Figure 12:
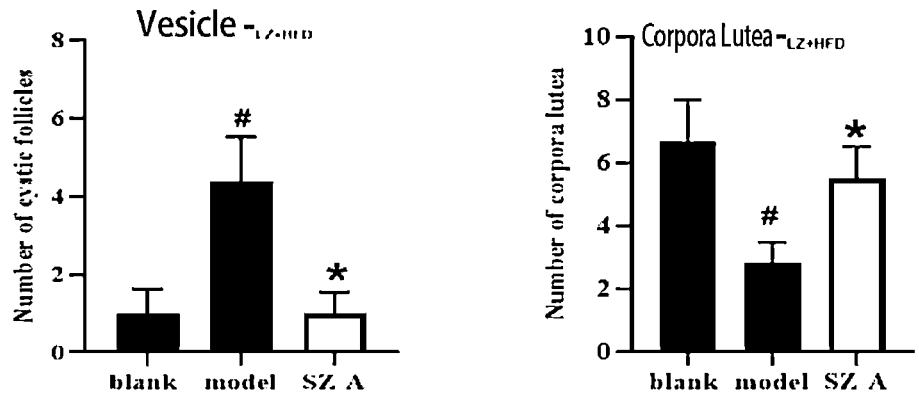
FIG. 12 shows the number of follicles and the number of *corpora lutea* in animals in the blank group, model group, and dosing group after administration for 21 days in Experimental Example 11.

The results were as shown in FIG. 11 and FIG. 12.

1) In the blank group, the overall structure of the ovarian tissue was normal, with visible follicles at all levels, clear texture inside the follicles, more and neatly arranged granulosa layers, obvious structure of the corpora lutea and without dilated vesicles.

2) In the model group, the number of dilated vesicles increased significantly and the number of corpora lutea decreased.

3) After treatment with SZ-A, the number of dilated vesicles was decreased remarkably, the number of corpora lutea was increased remarkably, and the ovarian pathology was significantly improved.

3. Effect of Drug on the Estrous Cycle of Rats with PCOS

Figure 13:
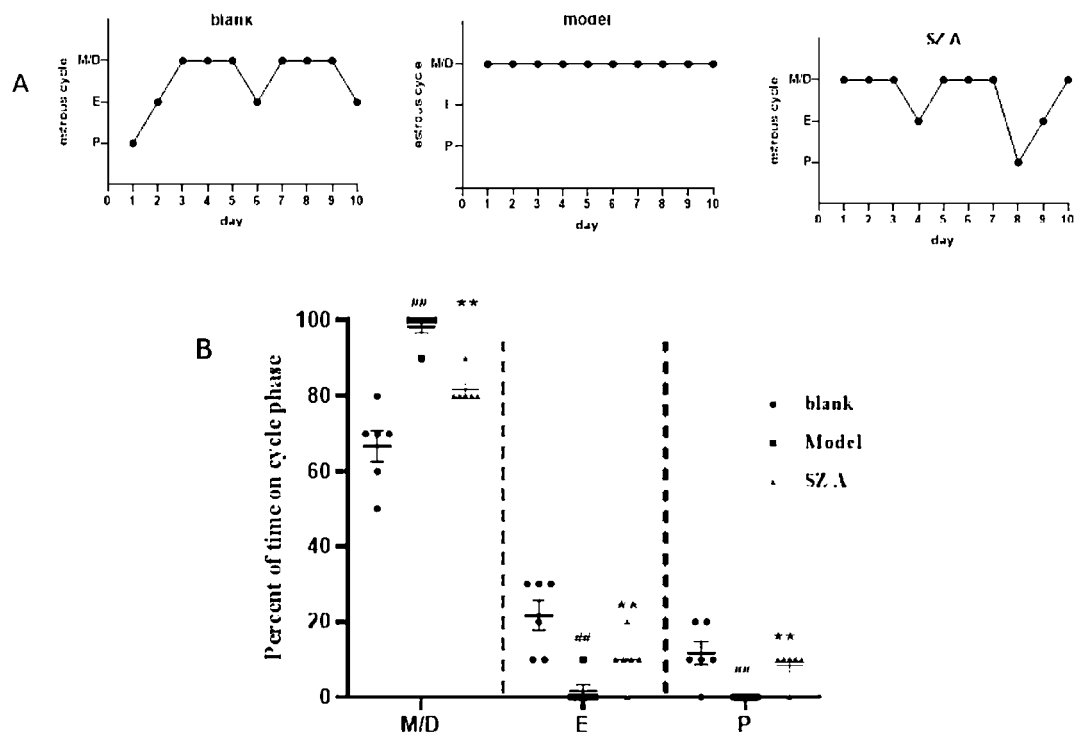
FIG. 13 is a diagram for analysis of estrous cycle of rats during the treatment period in Experimental Example 11; (A): representative estrous cycles in respective experimental groups; (B): quantitative analysis of the estrous cycles of the experimental animals; note: M/D indicates metestrus/diestrus; E indicates estrous; P indicates proestrus; # indicates P<0.05 when the model group is compared with the blank group, and ## indicates P<0.01 when the model group is compared with the blank group; * indicates P<0.05 when the dosing group is compared with the model group, and ** indicates P<0.01 when the dosing group is compared with the model group.

The results were as shown in FIG. 13.

The results showed that the rats in the blank group had a regular estrous cycle of about 4 to 5 days/cycle, while the rats in the model group were in metestrus or diestrus for a long time. After treatment with SZ-A, the estrous cycle of rats with PCOS could be significantly regularized, and the periods of metestrus and diestrus were significantly shortened and tended to be normal and the estrous state was significantly improved.

On the basis of the above experiment, the scale of experiment on the LZ+HFD-induced PCOS model was expanded (18 rats/groups) while keeping the modeling and dosing methods unchanged. The positive drugs Diane-35 and Metformin (Met.) groups and the SZ-A low/medium and high dose groups were designed. The specific groupings and dosing were as listed in Table 3.

TABLE 3

LZ + HFD Experimental Grouping and Dosing

| Groups | Abbreviations | Dosage based on alkaloids, mg/kg/d | Mode of Administration | Diets |
|---|---|---|---|---|
| Blank group | Blank | 0 | Oral gavage | Normal |
| Model group | model | 0 | | HFD |
| Positive drug | Diane-35 | 0.2 | | |
| | Met. | 125 | | |
| SZ-A | SZ-A-L | 67 | | |
| | SZ-A-M | 100 | | |
| | SZ-A-H | 150 | | |

Figure 14:
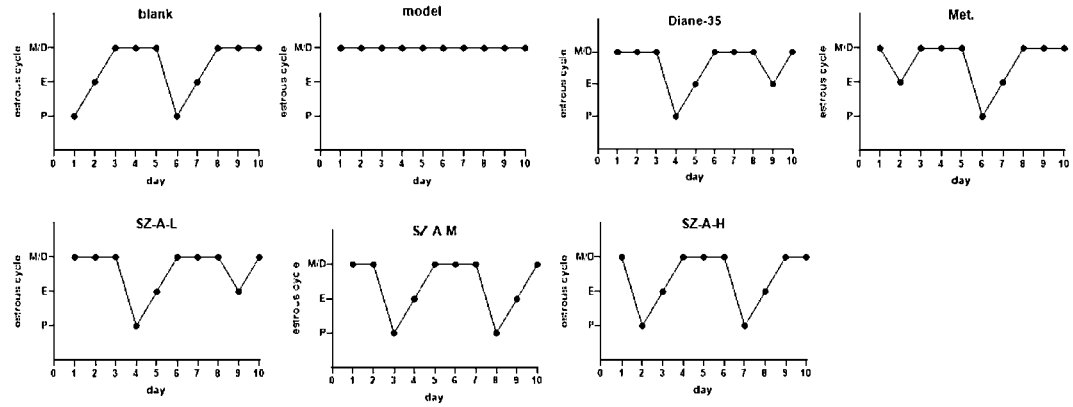
FIG. 14 is a diagram for analysis of estrous cycle of rats during the treatment period in Experimental Example 11 with an expanded experimental scale (18 rats/group); (A): representative estrous cycles in respective experimental groups; (B): quantitative analysis of the estrous cycles of the experimental animals; note: M/D indicates metestrus/diestrus; E indicates estrous; P indicates proestrus; # indicates P<0.05 when the model group is compared with the blank group, and ## indicates P<0.01 when the model group is compared with the blank group; * indicates P<0.05 when the dosing group is compared with the model group, and ** indicates P<0.01 when the dosing group is compared with the model group; * indicates P<0.05 when the SZ-A group is compared with the Diane-35 group, and ** indicates P<0.01 when the SZ-A group is compared with the Diane-35 group.
Figure 14:
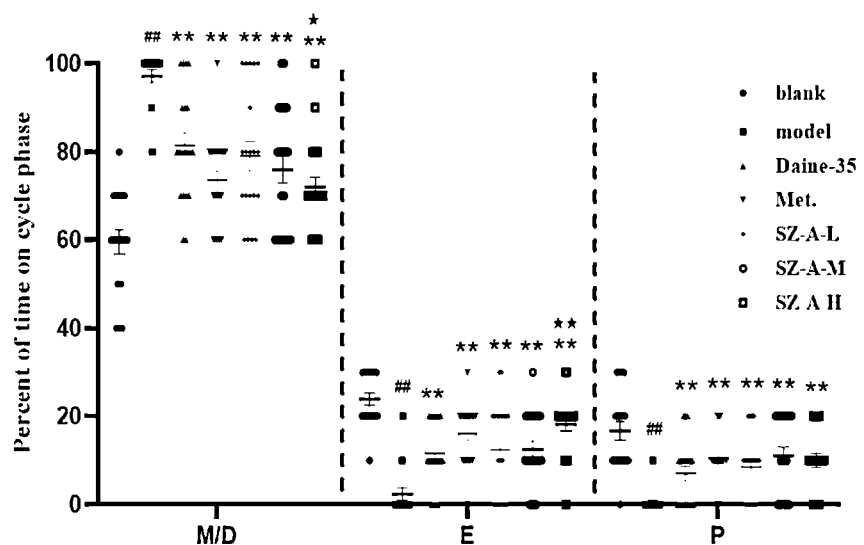

At day 10 of treatment, the estrous states of the rats were monitored for 10 days (FIG. 14). The results showed that the rats in the blank group had a regular estrous cycle of about 4 to 5 days/cycle (FIG. 14 A-blank), of which proestrus (P) accounted for about 17%, estrous (E) accounted for about 24%, and metestrus/diestrus (M/D) accounted for about 59% (FIG. B-blank). However, the rats in the model group did not have a regular estrous cycle and were almost always (97%) in the metestrus/diestrus phase (FIG. A/B-blank). After treatment with drugs, the metestrus/diestrus period in each of the dosing groups was shortened in comparison to the model group, and a regular estrous cycle appeared in the late period of drug administration. As the dosage of SZ-A increased, the pharmacodynamics effect was gradually enhanced; among them, the improvement effect of SZ-A-L was equivalent to that of the positive drug Diane-35 (the diestrus/metestrus accounted for 79% vs. 80%), and the pharmacodynamics effect of SZ-A-H was significantly better than that of the Diane-35 (the diestrus/metestrus accounted for 72% vs. 80%) and slightly better than Met. (the diestrus/metestrus accounted for 72% vs. 74%).

Experimental Example 12: Pharmacodynamic Experiment of Mulberry Extract on DHEA-Induced PCOS Model 1. Formulation of Drugs DHEA (dehydroepiandrosterone): 30 mg/mL, 30 mg of DHEA were dissolved in 1 mL of soybean oil, placed on a magnetic stirrer at 50° C. and a rotation speed of 500 r/min, and stirred until DHEA was completely dissolved.

1% CMC: 1 g of CMC was weighed, added into 100 mL of pure water, placed on a magnetic stirrer at a temperature of 60° C. and a rotation speed of 500 r/min, and stirred until CMC was completely dissolved and was transparent.

The mulberry extract SZ-A prepared in Example 1 was formulated into different concentrations and dissolved in 1% CMC solutions.

2. Experimental Grouping

TABLE 4

| Groups | Abbreviations | Number of Animals | Dosage based on alkaloids (mg/kg/d) | Mode of Administration | Diets |
|---|---|---|---|---|---|
| Blank group | blank | 6 | 0 | Oral gavage | Chow (normal diets) |
| Model group | model | 6 | 0 | | |
| Dosing group | SZ-A | 6 | 100 | | |

3. Experimental Method

Eighteen 3-week-old female SD rats with good health and shiny fur were selected and adaptively fed for 3 days, and then randomized into a blank group, a model group, and a dosing group, with six rats for each group. The rats in the blank group were fed with basal diets and subcutaneously injected with a solvent (60 mg/kg/d), while the rats in the model group and the dosing group were fed with normal diets and subcutaneously injected with DHEA oil solution (60 mg/kg/d) for 42 days, and the PCOS rat models were established. After successful modeling, the rats in the blank group were further fed with basal diets, and administered with normal saline (100 mg/kg/d) via oral gavage; the rats in the model group and the dosing groups were further fed with basal diets, and at the same time, the rats in the model group were administered with normal saline (100 mg/kg/d) via oral gavage, while the rats in the dosing group were administered with SZ-A (100 mg/kg/d) via oral gavage. After treatment for 21 days, the samples were collected for evaluation on pharmacodynamics.

4. Results

1. Sex Hormone Indexes

Figure 15:
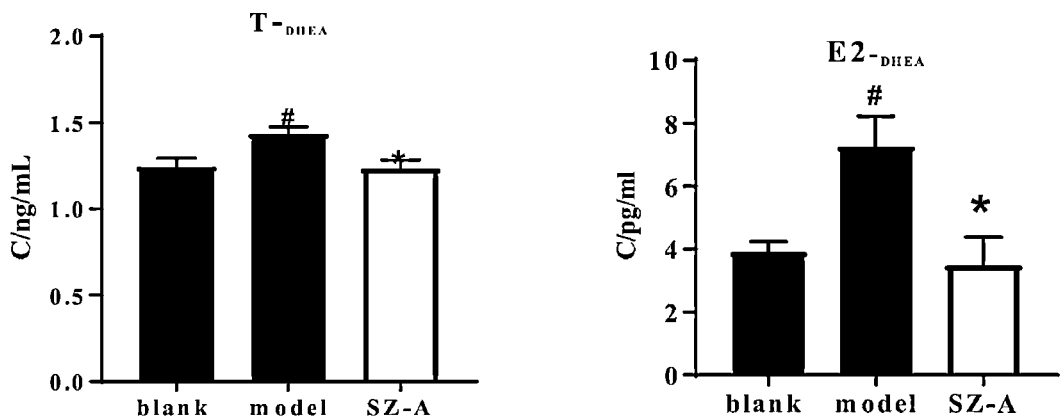
FIG. 15 shows the T and E2 levels in serum of animals in the blank group, model group, and dosing group after administration for 21 days in Experimental Example 12; # indicates P<0.05 when the model group is compared with the blank group, and ## indicates P<0.01 when the model group is compared with the blank group; * indicates P<0.05 when the dosing group is compared with the model group, and ** indicates P<0.01 when the dosing group is compared with the model group.

Both the T and E2 levels in the model group (vs. blank) were significantly increased, and the administration with SZ-A (100 mg/kg) could significantly improve the expression of T and E2 (the results were as shown in FIG. 15).

2. Ovarian Pathology

Figure 16:
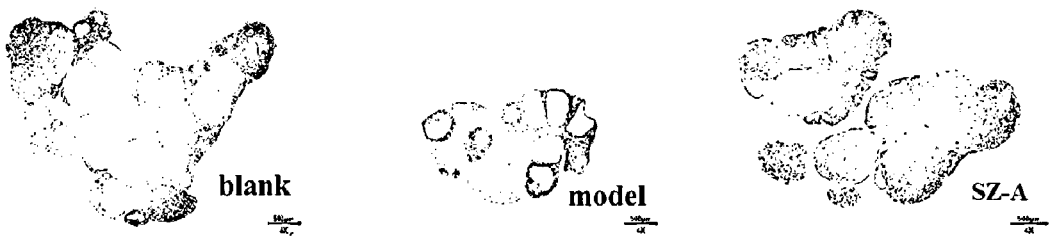
FIG. 16 shows the pathological sections of ovaries of animals in the blank group, model group, and dosing group after administration for 21 days in Experimental Example 12.
Figure 17:
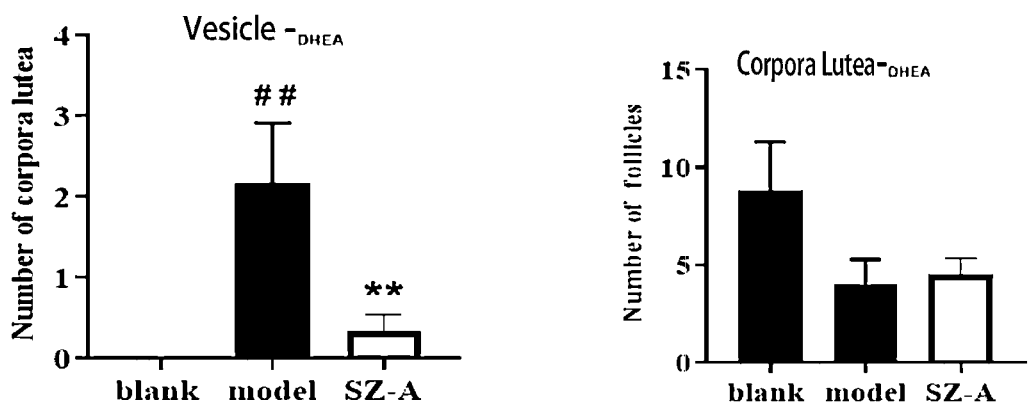
FIG. 17 shows the number of follicles and the number of *corpora lutea* in animals in the blank group, model group, and dosing group after administration for 21 days in Experimental Example 12; # indicates P<0.05 when the model group is compared with the blank group, and ## indicates P<0.01 when the model group is compared with the blank group; * indicates P<0.05 when the dosing group is compared with the model group, and ** indicates P<0.01 when the dosing group is compared with the model group.

The results were as shown in FIG. 16 and FIG. 17. As could be seen from FIG. 16 and FIG. 17, follicles at all levels could be observed in the blank group with clear texture inside the follicles, more and neatly arranged granulosa layers, and obvious structure of the *corpora lutea*. In the model group, the number of dilated vesicles increased significantly and the number of *corpora lutea* decreased. After administration with SZ-A, the number of dilated vesicles was decreased remarkably, and the ovarian pathology was significantly improved.

Experimental Example 13: Pharmacodynamic Experiment of Mulberry Extract on DHEA+HFD-Induced PCOS Model 1. Formulation of Drugs DHEA (dehydroepiandrosterone): 30 mg/mL, 30 mg of DHEA were dissolved in 1 mL of soybean oil, placed on a magnetic stirrer at 50° C. and a rotation speed of 500 r/min, and stirred until DHEA was completely dissolved.

1% CMC: 1 g of CMC was weighed, added into 100 mL of pure water, placed on a magnetic stirrer at a temperature of 60° C. and a rotation speed of 500 r/min, and stirred until CMC was completely dissolved and was transparent.

The mulberry extract SZ-A prepared in Example 1 was formulated into different concentrations and dissolved in 1% CMC solutions.

2. Experimental Grouping

TABLE 5

| Groups | Abbreviations | Number of Animals | Dosage based on mulberry twig alkaloids, mg/kg/d | Mode of Administration | Diets |
|---|---|---|---|---|---|
| Blank group | blank | 6 | 0 | Oral gavage | Chow |
| Model group | model | 6 | 0 | | HFD |
| Dosing group | SZ-A-L | 6 | 50 | | |
| Dosing group | SZ-A-M | 6 | 100 | | |

21-day-old female SD rats that were newly weaned, in good health, and had shiny fur were selected and adaptively fed for 3 days, and then randomized into a blank group, a model group, an SZ-A-L group, and an SZ-A-M group, with six rats for each group. The rats in the blank group were fed with basal diets and subcutaneously injected with a solvent (60 mg/kg/d), and the rats in the model group and the dosing groups were fed with HFD (high-fat diets (research diets D12492)) and subcutaneously injected with DHEA oil solution (60 mg/kg/d) simultaneously to constantly induce modeling for 7 weeks, and the PCOS rat models were established.

After the models were evaluated as success, the rats in the blank group were further fed with basal diets and administered with normal saline (100 mg/kg/d) via oral gavage; the rats in the model group and the dosing groups were further fed with high-fat diets, and at the same time, the rats in the model group were administered with normal saline (100 mg/kg/d) via oral gavage, while the rats in the SZ-A-L group were administered with SZ-A (50 mg/kg/d) via oral gavage, and the rats in the SZ-A-M group were administered with SZ-A (100 mg/kg/d) via oral gavage. After consecutive treatment for 21 days, the samples were collected for testing pharmacodynamics, and the test and analysis methods were the same as those in Experimental Example 9.

4. Results

Figure 18:
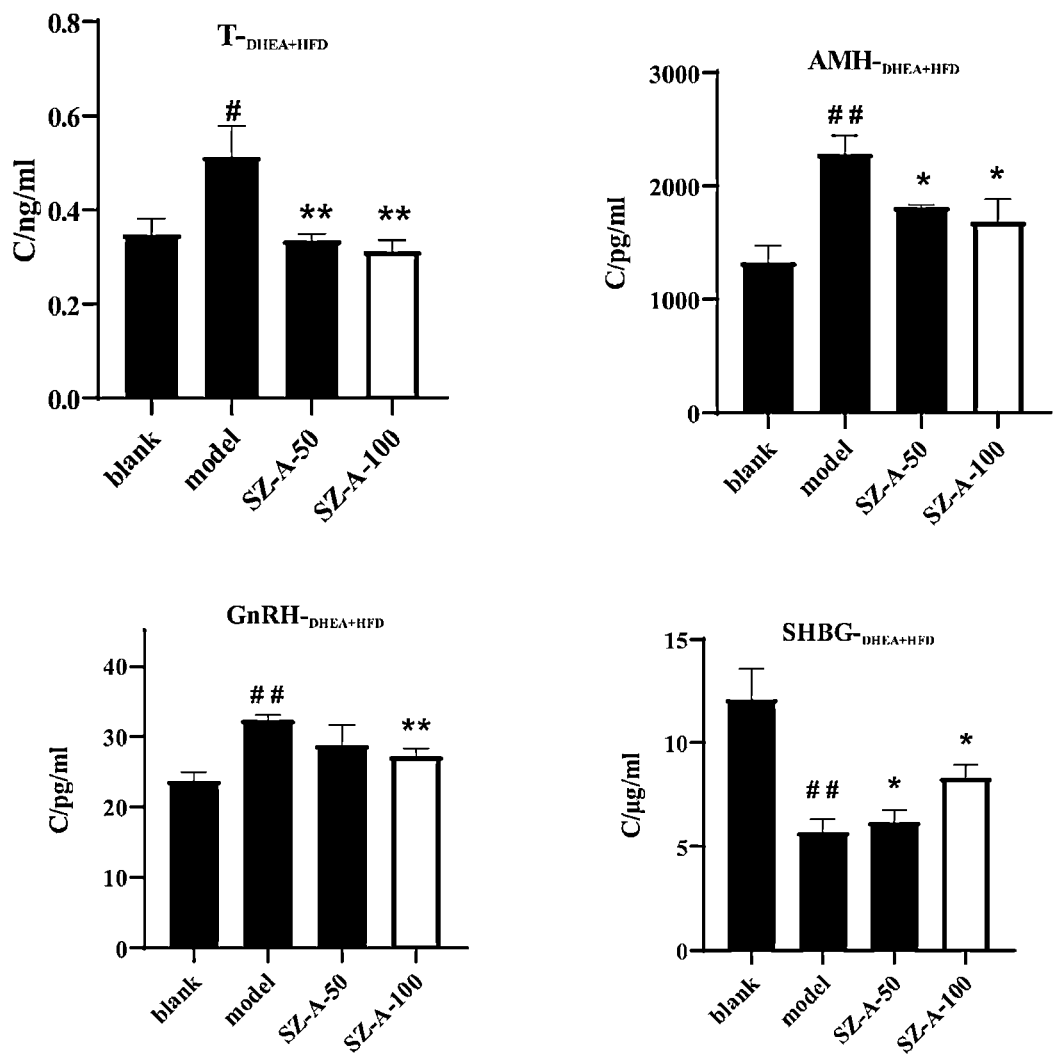
FIG. 18 shows the T, AMH, GnRH, and SHBG levels in serum of animals in the blank group, model group, and dosing group after administration for 21 days in Experimental Example 13. # indicates P<0.05 and ## indicates P<0.01 when the model group is compared with the blank group; * indicates P<0.05 and ** indicates P<0.01 when the dosing group is compared with the model group.

1) The T, AMH, and GnRH levels in the model group (vs. blank) were significantly increased, and the administration with SZ-A (50 or 100 mg/kg) could significantly reduce the expression of T and AMH; and SZ-A (100 mg/kg) could further significantly reduce the GnRH expression, and SZ-A (50 mg/kg) reduced the expression trend of GnRH. The specific results were as shown in FIG. 18.

2) The SHBG level in the model group (vs. blank) was significantly reduced, and the administration with SZ-A (50, 100 mg/kg) could significantly increase the SHBG expression. The specific results were as shown in FIG. 18.

The above test results of pharmacodynamics confirm that SZ-A has a certain therapeutic effect on PCOS.

INDUSTRIAL APPLICATIONS

The present disclosure proves through pharmacodynamic experiments that SZ-A can reduce the ovarian weight and ameliorate the ovarian pathology of rats with PCOS; in the SZ-A dosing group, the estrous cycle of rats with PCOS is regularized during intervention; and the SZ-A drug can significantly regulate the secretion level of sex hormone in rats with PCOS. The above results suggest that SZ-A may be developed into a product for treating and/or ameliorating the polycystic ovarian syndrome.

What is claimed is:

1. A method of preventing and/or treating polycystic ovarian syndrome in a subject in need thereof comprising administering to the subject a composition comprising mulberry extract, wherein:

based on the mulberry extract, the weight content of each component is as follows:

| | |
|---|---|
| alkaloids | 30% to 99%, |
| polysaccharides | 0.2% to 35%, |
| flavonoids | 0% to 2%, |
| amino acids | 0% to 30%, |
| other components | 0% to 20%; | wherein the mulberry extract is prepared according to a method comprising the steps of:
 1) preparing a crude extraction solution of a plant of the genus *Morus* comprising the steps of:
  a) crushing ramulus, cortex, or folium obtained from the plant; and
  b) extracting the sample with water, acidic water, alcohol, or a combination thereof; and
 2) separating the crude extraction solution via a cation resin or a cation resin and an anion resin to obtain the mulberry extract.

2. The method according to claim 1, wherein the treating and/or preventing the polycystic ovarian syndrome is embodied in at least one of:
 1) regulating a secretion level of sex hormone in a patient with the polycystic ovarian syndrome;
 2) regularizing a menstrual cycle in a patient with the polycystic ovarian syndrome; and
 3) ameliorating an ovarian polycystic-like state in a patient with polycystic ovaries.

3. The method according to claim 2, wherein the sex hormone is at least one selected from the group consisting of: testosterone, estradiol, luteinizing hormone, prolactin, progesterone, sex hormone-binding globulin, and anti-Müllerian hormone.

4. The method according to claim 1, wherein the subject is a human or mammal.

5. The method according to claim 1, wherein the method of preparing the mulberry extract further comprises the steps of:
 3) subjecting effluent obtained from resin separation in step 2) to alcohol precipitation, and collecting a supernatant; and
 4) subjecting the supernatant to concentration and drying.

6. The method according to claim 1, wherein the method of preparing the mulberry extract further comprises the step of: subjecting effluent obtained from resin separation in step 2) to concentration and drying.

* * * * *